March 12, 1940. E. A. SCHOTTENBERG 2,193,298
METHOD OF PRODUCING MUNTIN BAR STRUCTURES
Filed Oct. 11, 1938 2 Sheets-Sheet 1
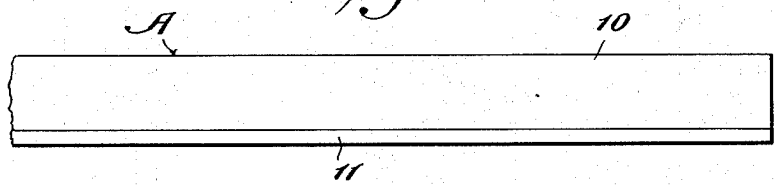
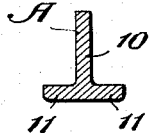
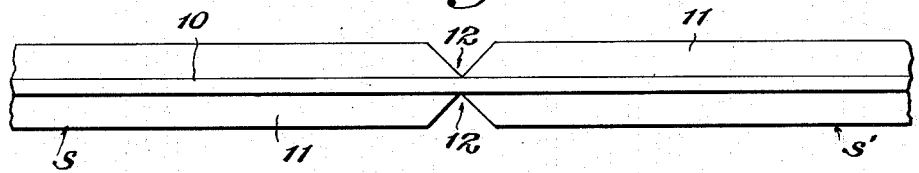
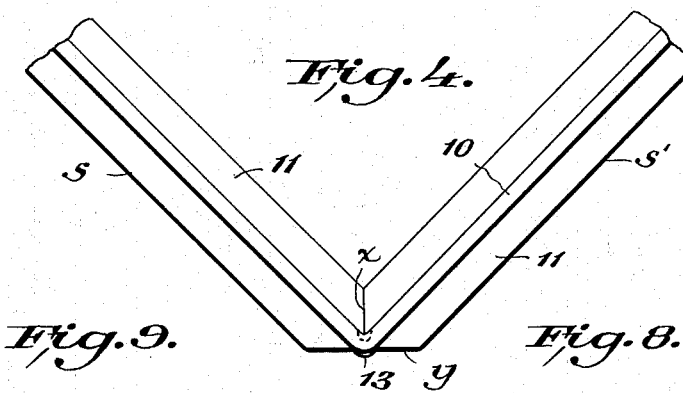
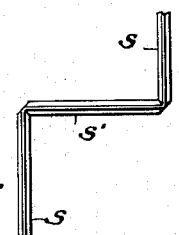
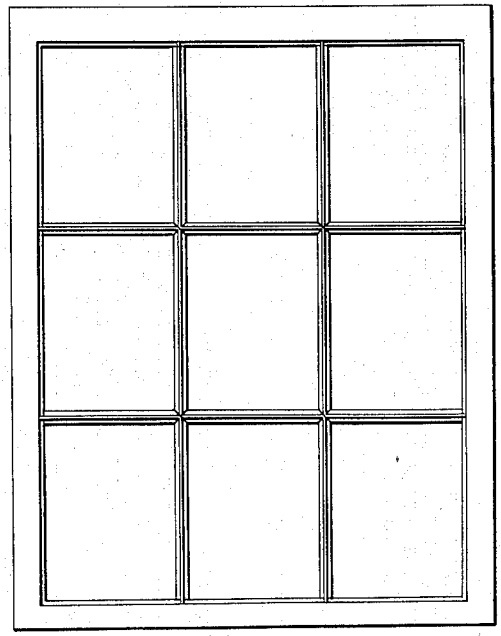
Inventor
E. A. Schottenberg,
By Wolhaupter & Groff
Attorneys March 12, 1940. E. A. SCHOTTENBERG 2,193,298
METHOD OF PRODUCING MUNTIN BAR STRUCTURES
Filed Oct. 11, 1938 2 Sheets-Sheet 2

Inventor
E. A. Schottenberg,
By Wolhaupter & Groff
Attorneys

Patented Mar. 12, 1940

2,193,298

UNITED STATES PATENT OFFICE 2,193,298

METHOD OF PRODUCING MUNTIN BAR STRUCTURES

Elmon A. Schottenberg, Youngstown, Ohio, assignor to Truscon Steel Company, Youngstown, Ohio, a corporation of Michigan Application October 11, 1938, Serial No. 234,485

3 Claims. (Cl. 29—155)

This invention relates to a method of producing muntin bar structures for use in window sashes to support window panes, or for use in grilles and the like or equivalent structures.

Heretofore, in forming muntin bar structures comprising bar sections extending, in effect, in crossing, right angular or other desired angular relationship to each other, the usual practice has been to dispose a pair of bar sections at opposite sides of a first bar section in desired angular relationship to the first bar section and to weld the ends of the pair of bar sections to the opposite sides of the first bar section. Obviously, according to such prior practice, the forming of any given joint required the cutting of three bar sections and the making of two separate welded joints, one between each of the pair of bar sections and the first bar section. As a consequence, the fabrication of any given structure, especially where a multiplicity of window lights were required, was more or less involved, and the time and labor involved made production costs correspondingly high.

Accordingly, the present invention has primarily in view a novel method of fabricating sash including a muntin joint and muntin bar structure which greatly reduces the number of parts necessary to make the glass holding area of a sash, and likewise reduces the number of operations involved in making or assembling, thus resulting in speeding up fabrication and reducing ultimate costs, while providing both a structurally stronger and tighter finished product, wherein the infiltration of air is practically nil.

With the foregoing general objects in view, the invention consists in the novel method steps employed in fabricating same, as will be hereinafter more fully described, illustrated in the accompanying drawings and defined in the appended claims.

In the accompanying drawings, wherein like characters of reference denote corresponding parts in the different views:

Figure 1 is a side elevation of a fragment of a stock bar of one suitable sectional shape for use in forming muntin bar structures in accordance with the invention.

Figure 2 is a cross section through the bar fragment shown in Figure 1.

Figure 3 is a plan view of the bar fragment shown in Fig. 1, illustrating the first method step of the present invention.

Figure 4 is a plan view illustrating the second method step of the present invention.

Figures 7 and 8 are plan views illustrating different ways of forming muntin bar structures in accordance with the invention, Figure 9 is an elevation of a window sash equipped with a muntin bar structure produced in accordance with the invention; and Figure 10 is a detail plan view illustrating a construction in which the sections of the bars have an acute angular relationship to each other.

Figures 5, 6:
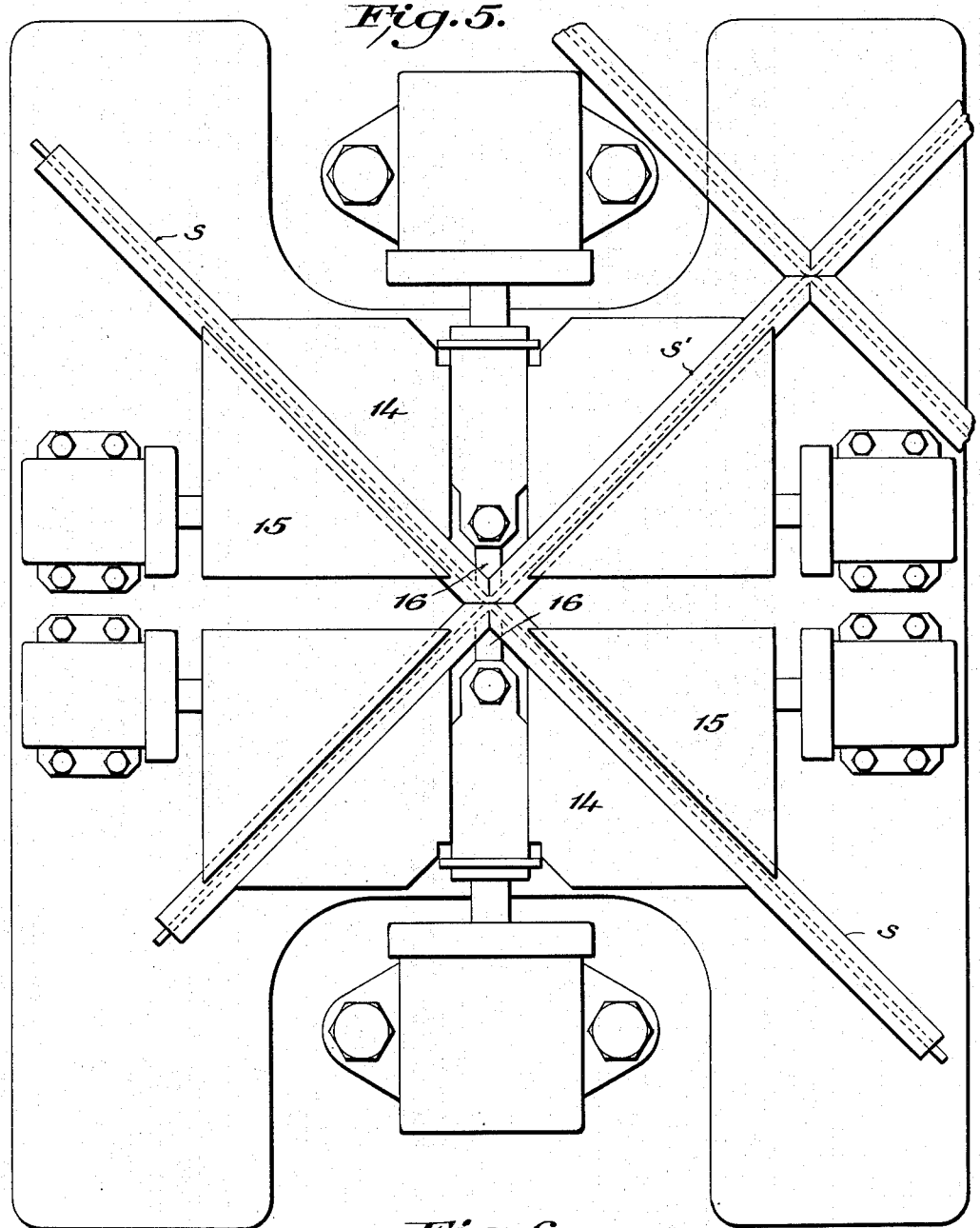
Figure 5 is a plan view illustrating the third method step of the present invention.
Figure 6 is a cross sectional view illustrating the initial part of the third method step of the invention.

Referring to the drawings in detail, it will be observed that the bar stock A from which the present improved muntin bar structure is formed, is illustrated in the present instance as being of T-shape in cross section, embodying a web 10 and a flange 11 extending laterally from each side of said web. This is a form of bar commonly employed in the fabrication of sash mutins, and therefore has been chosen for purposes of illustration in the present instance. It is to be understood, however, that the bar stock may have other cross sectional shapes, depending upon the purpose it is to serve. For example, it may be of I-shape, L-shape, U-shape or H-shape in cross section or, within the broader aspects of the invention, it may even be flangeless and simply of rectangular, circular or other desired cross sectional shape, as will hereinafter become more fully apparent.

According to the present invention in its broader aspects, in order to provide a muntin bar structure comprising four bar sections extending, in effect, in crossing, right angular or other desired angular relationship, only two bar sections are required and only a single welded joint is required to connect said bar sections. Consequently, fabrication procedure is greatly simplified and production costs are correspondingly lowered.

Generally speaking, the present method comprises bending a pair of bar elements upon themselves to provide each of the same with a pair of bar sections disposed in desired angular relationship to each other, then disposing the bent bar elements in corner-to-corner relationship with the four bar sections disposed in desired angular relationship to each other, and then welding the bar elements together at their corners. In this way there obviously is accomplished by means of only two bar elements and only a single welded joint all that has heretofore been accomplished by means of three bar elements and two welded joints. Moreover, the two-bar-element, single-welded-joint structure has the advantage that it is stronger and sturdier than the three-bar-element, two-welded joint structure for reasons that are manifest.

If the bar stock is of a sectional shape including a web and one or more flanges extending from either or both sides of said web, the first step in accordance with the present method is to notch the flange, or flanges, of each of a pair of the stock bar elements at the point, or points, where said elements are to be bent to provide each of the same with its respective bar sections. In Fig. 3 of the drawings this notching of the flanges 11, 11 of one of the stock bar elements of T-shaped cross section is indicated at 12, 12. The notches, of V-shape, are alined with each other transversely of the bar element and, of course, flare toward the outer edges of the flanges, beginning, preferably, at points in alinement with the opposite faces of the web, respectively. By notching the bar element the same is, in effect, divided into a pair of bar sections, designated as S and S', respectively. Two bar elements are, of course, thus notched, the angularity of the flange ends formed by the notches depending, of course, upon the angle to which the respective bar sections S, S', are to be bent relative to each other. In this connection it is assumed in the present instance that the bar sections S, S' are to be bent into right angular relationship. Accordingly, the notches 12, 12 have ninety degree angles. That is to say, the flange ends formed by said notches are disposed at angles of forty-five degrees to the bar elements.

Following notching of the flanges 11, 11 of a selected bar element the latter is bent in any suitable manner at said notches to bring their respective sections, S, S' into desired angular relationship to each other, in the present instance into right angular relationship. This has the effect of closing the notch $x$ at the inner sides of the bar elements and of opening the notch at the other side of the bar until the notch-formed end-walls of the flanges at the outer sides of the bar elements become alined with each other, as illustrated at $y$ in Fig. 4 of the drawings. Whether the bar sections S, S' are to be bent into right angular or other angular relationship, the notches 12, 12 are formed so that upon bending of the bar sections to desired angular relationship, the notches at the inner sides of the bar elements are closed and the notch-formed end walls of the flanges at the outer sides of the bar elements are brought into alinement with each other at right angles to a line bisecting the angle formed by the sections S, S'.

The next step of the present method resides in arranging the bent bar elements in corner-to-corner abutting relationship, in clamping or otherwise suitably holding them in this relationship, and in welding them together at their corners, as illustrated in Fig. 5 of the drawings. Either gas arc, resistance, or projection welding may be employed, preferably the latter. In this case the step of bending the sections S, S' into desired angular relationship to one another is followed by die-pressing or forming protuberances 13 at the outer corners of the web 10 of one or both of the bar elements to be united to facilitate the welding. The use of the protuberance or nib 13 greatly facilitates the formation of the weld in the respect that since it aids in quick melting of the metal at the nibs, the weld rapidly spreads outwardly along the surfaces $y$, and upon cooling and shrinking forms an airtight joint. In any event, welding of the bar elements prepared in the manner stated obviously results in a muntin bar structure comprising only two bar elements, each including two bar sections integral with and angularly related to each other, and in which the bar sections of the respective bar elements are, in effect disposed in crossing relationship to each other. The structure thus is exceptionally strong and sturdy and its fabrication obviously may be effected with facility and, consequently, at low cost.

The foregoing description has dealt with the forming of only a single joint between a pair of bar elements each including only two bar sections. In this connection it is apparent that any given bar element may be bent into any desired number of bar sections disposed in various different relationships to each other and that the joining together of such a bar element with another bar element embodying two or more bar sections having either the same relative disposition as the bar sections of the first bar element, or a different relative disposition, involves simply duplication of welded joints between the corners of the respective bar elements. For example, Fig. 7 of the drawings illustrates that the successive bar sections S, S' of a given bar element may have a stepped relationship to each other; Figure 8 of the drawings illustrates that successive bar sections S, S' of a given bar element may be bent to provide the bar element with U-shaped formations, and Figure 9 illustrates a pair of stepped bar elements joined together in corner-to-corner relationship and combined with a pair of corner bar elements of L-shape to provide a complete sash muntin structure which, when embodied in the sash, as shown, provides spaces to receive nine window panes. Obviously, the manner of bending the bar sections of the bar elements, and the manner of assembling or combining the different bar elements with each other, in any given muntin structure, may, within the purview of the invention, be varied within wide limits.

While any suitable apparatus may be employed for holding the different bar elements in correct relationship to each other during welding together of the same, and while any suitable apparatus may be employed for welding the elements together, one apparatus especially suited to simultaneously accomplish both of said purposes is illustrated in Figure 5 of the drawings. As shown, said apparatus comprises fixed clamp elements 14 and cooperating movable clamp elements 15 for gripping and holding a pair of bar elements in corner-to-corner relationship, and a pair of power operated electrodes 16 to urge the respective bar elements together at their corners and to maintain them urged together during the welding operation which, of course, is effected by including said electrodes in circuit with a proper source of electrical energy.

As to the fastening of the outer ends of the bar sections of any given muntin structure to the rails of a window sash or other frame element, that may be done by welding or in any other suitable manner with which the present invention is not concerned.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. The method of fabricating a muntin bar structure from bar elements each having a web and a lateral flange, which comprises forming in the flange of each bar element a V-shaped notch, bending each bar element upon itself at said notch to provide a pair of bar sections diverging relative to each other from the bend with their flanges disposed outwardly and the notch opened, arranging said bar elements in corner-to-corner relationship, and welding said elements together at their corners.

2. The method of fabricating a muntin bar structure from bar elements each having a web and a flange extending laterally from each side thereof, which comprises forming in each side portion of the flange of each bar element, at points alined transversely of the bar element, a V-shaped notch, bending each bar element upon itself at said notches to provide a pair of bar sections diverging relative to each other from the bend with the flange side portions thereof extending inwardly and outwardly, respectively, and to close the notch in the inner side portion of the flange and open the notch in the outer side portion of the flange, arranging the bar elements in corner-to-corner relationship, and welding said elements together at their corners.

3. The method of fabricating a muntin bar structure which comprises bending each of a pair of bar elements upon itself to provide a pair of bar sections diverging relative to each other from the bend, forming protuberances on the corner of at least one of said elements at the bend therein to facilitate resistance welding together of the elements at their corners, arranging said elements in corner-to-corner relationship, and resistance welding said elements together at their corners.

ELMON A. SCHOTTENBERG.